United States Patent [19]

Ockert

[11] 4,080,186
[45] Mar. 21, 1978

[54] DEVICE FOR EXTRACTING ENERGY, FRESH WATER AND POLLUTION FROM MOIST AIR

[76] Inventor: Carl E. Ockert, 8818 Higdon Dr., Vienna, Va. 22180

[21] Appl. No.: 757,557

[22] Filed: Jan. 7, 1977

[51] Int. Cl.² .............................................. B01D 45/14
[52] U.S. Cl. ....................................... 55/438; 55/439; 55/450; 55/459 R; 60/692
[58] Field of Search .................. 55/438, 439, 450, 453, 55/455, 459 R, 459 D, 467, 470, 472, 474; 60/690, 692

[56] References Cited

U.S. PATENT DOCUMENTS

| 1,700,261 | 1/1929 | Hawley | 55/455 X |
| 3,347,027 | 10/1967 | Baker et al. | 55/455 X |
| 3,516,551 | 6/1970 | Wallen et al. | 55/459 D X |
| 3,944,407 | 3/1976 | Kwasniak | 55/455 |
| 4,016,725 | 4/1977 | Fiss | 60/690 |

FOREIGN PATENT DOCUMENTS 1,101,451  10/1955  France ..................................... 55/450

OTHER PUBLICATIONS

Centrifugal Type In-Line Entrainment Separators, Bulletin 809-F, 6/1966, Wright-Austin Co., Detroit, Michigan.

Primary Examiner—Charles N. Hart
Assistant Examiner—Robert H. Spitzer

[57] ABSTRACT

This disclosure describes a device to extract useful energy and fresh water from moist air, with an associated removal of pollutant particles entrained in the extracted water. The device comprises an enclosure with a tall stack and an extended base which has means for the creation and utilization of a contained tornado which is powered by the energy release associated with the rapid condensation of water from the incoming moist air.

16 Claims, 2 Drawing Figures

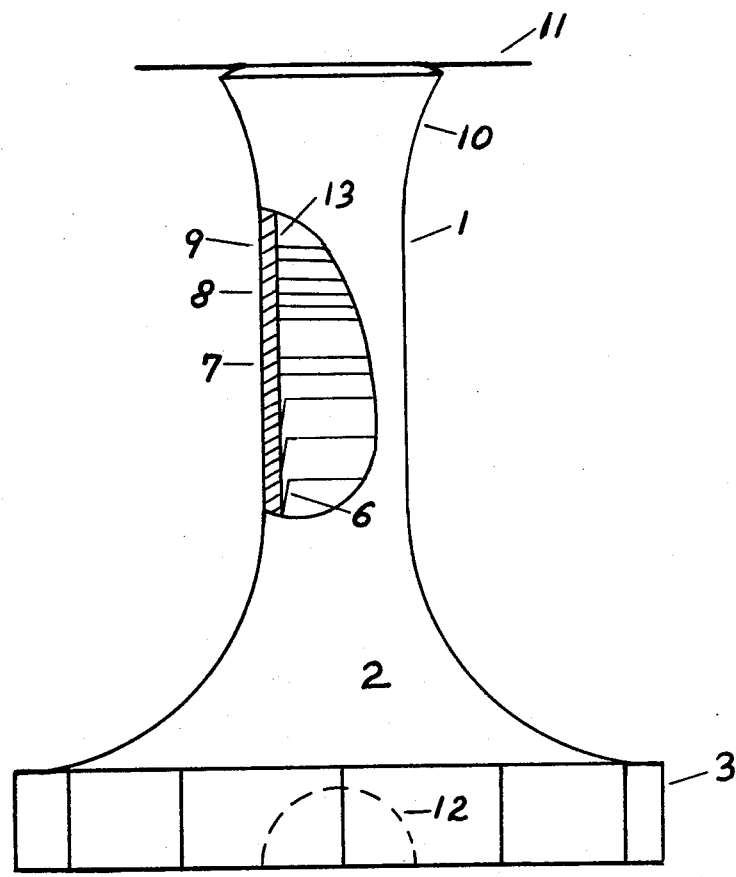
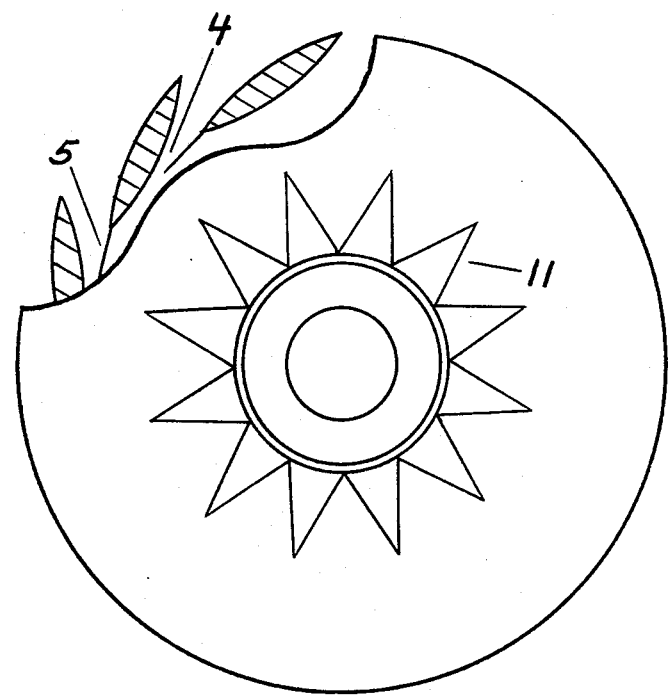

DEVICE FOR EXTRACTING ENERGY, FRESH WATER AND POLLUTION FROM MOIST AIR

The invention described herein relates to the controlled use and exploitation of a previously neglected source of energy, the energy in the heat of vaporization of the water vapor in moist air. The several objects of this invention are to obtain useful energy, fresh water, and purified air as a result of the controlled condensation of the water vapor from large quantities of moist air. This device has been given the name "Tornook" since it utilizes the characteristics of the natural winds known as the Tornado and the Chinook. The particular characteristics utilized are the energetic low pressure vortex and the rapid condensation and precipitation which occur in the Tornado, and the "Chinook Wind" effect which causes air to become heated when it is repressurized after being stripped of its moisture content by passing through a region of low barometric pressure.

The Tornook comprises a large stack with an extended base, with inlets in the base arranged to impart a rotational velocity to the incoming air which is then accelerated into a tornadic vortex as the flowfield contracts through a transitional plenum region and enters the stack. The resulting lowering of the static pressure provides a density difference which assists in sustaining the flow, and the low pressure also causes a rapid precipitation of the moisture from the air. Energy can be extracted from the rapidly rotating air mass before its rotation is removed and it is repressurized with a consequent heating which maintains a relatively low density as the air passes up through the top of the stack.

The features and characteristics of this device will be understood more clearly by reference to the appended drawings.

FIG. 1 shows an elevation view of a typical installation, delineating most of the important features including the stack, the extended base, the bell shaped vortex formation region, the water collection system, the energy extraction system, the diffuser vanes, the exit control valve, and the preheaters. It may be noted that the typical Tornook installation will be an impressively large structure and will appear somewhat similar to a natural draft cooling tower.

FIG. 2 shows a plan view with a delineation of the tangential inlet ports and control vanes in the extended base structure.

Referring to FIG. 1, it is seen that the Tornook comprises a large structure with a stack 1, a bell shaped transition plenum 2, and an extended base 3. This structure is fabricated of any of the materials commonly used in the construction of natural draft cooling towers, usually reinforced concrete. The openings 4, in the extended base (FIG. 2) are arranged to impart a rotational velocity vector to the incoming moist air. This function is assisted by the movable control vanes 5, which can vary the rotational velocity component given to the air. The result is a swirling inflow which is accelerated into a tornadic vortex as it contracts to enter the stack.

The lowered barometric pressure produced by this vortex maintains a low average density of air in the vortex region of the stack. It also causes the rapid condensation of moisture which is then forcefully precipitated by the centrifugal force of the vortex. This condensed water is collected as shown in FIG. 1, by drains, pipes, troughs, channels, or other suitable collection provisions 6, located in the floor and in the wall of the lower region of the stack. These collectors shield the water from reentrainment in the vortex and pipe it off to a suitable storage tank or reservoir.

After release of its moisture, the rotation of the air column is slightly reduced by diffuser vanes 7, or other suitable means, such that the static pressure is slightly increased along with a small rise in temperature. The purpose of this stage is to revaporize any residual water particles to avoid erosion of the surfaces of the energy extraction equipment 8. The still energetically rotating air column then passes through the energy extraction equipment 8, which can be a series of propeller blades, turbine wheels and stators, or other wind machine devices, or any other suitable means for the extraction of energy from high velocity gas, including magnetohydrodynamic or electrical devices.

After the extraction of the desired portion of the available kinetic energy, the rotating air mass can be allowed to pass up through and discharge from the top of the stack, or the residual rotation can be converted to axial momentum by a suitable series of turning vanes 9, which also produce a repressurization and heating of the dried air. Thus a low density air column is maintained throughout the stack region, by the barometric depression of the vortex in the lower portion of the stack, and by the high temperature of the repressurized air in the upper portion of the stack. It is this difference in density between the internal air and the external air that provides the convection driving head which sustains the flow through the Tornook.

The top of the stack 10, is preferably diverged in order to reduce the exit losses and facilitate the throughflow. A valve, damper, or other suitable control device 11, is located at or near the top of the stack to assist in starting, stopping, and moderating the flow through the Tornook. To initiate the flow, the valve is closed, and the preheaters 12 are operated until the entire stack is filled with hot air and/or flue gas. The walls of the stack may have insulation 13, to reduce heat losses during start up. When the air reaches a sufficiently high temperature, approximately 150° to 200° F, the heaters are shut off and the exit valve 11, is fully opened. The outrush of the hot low density air from the stack causes inflow of moist air and the resulting formation of the self sustaining vortex. During the start up period, the turbine wheels 8, can be spun up to idle speed to reduce the impedance to flow, or they may be driven even faster to provide an augmented pumping action to assist in establishing the full flow condition.

When the vortex is fully established, load can be applied to the energy extraction equipment until the desired proportion of energy output is obtained, as may be available under existing atmospheric conditions. It may be noted that maximum throughflow and maximum recovery of water are associated with a zero take off of power. As the rate of energy extraction is increased, throughflow is reduced until a maximum power output is obtained. Increasing the load beyond this maximum will result in further reductions in throughflow and a consequent reduction in power output.

The Tornook can be controlled by varying the load on the power take off 8, or by the action of the stack valve 11, or by adjustment of the vanes 5, in the tangential inlet openings 4.

The important parameters which effect the performance capability of the Tornook are the height, diameter, internal resistance to flow, the rotational component imparted at the inlet, the degree of contraction of the flow field in the plenum, and the difference in density between the internal and the external air. In addition, the performance will be strongly affected by the relative and absolute humidity of the incoming moist air. The absolute humidity of the inlet air determines the overall available heat of condensation, and the relative humidity determines the parasitic portion of the adiabatic expansion process required to reduce the air to the saturation pressure and temperature condition at which point the release of condensation energy can begin.

Since the available energy decreases with decreasing humidity, at some point there will be just enough energy to sustain the vortex, with no extraction of useful energy. At a still lower humidity, the Tornook will not operate without an input of external power.

In addition to its primary use for extracting water and energy from naturally occurring air masses, the Tornook device can be adapted to be used for the extraction of water and energy from artificially moisturized air. Power stations which have inadequate supplies of cooling water can combine a Tornook device with their wet cooling towers such that most of the moisture in the exhaust plumes of the wet towers is recovered in the Tornook, with the waste heat passing up the stack in the form of hot clean dry air. It may also be possible to extract some additional useful energy in the process.

Thus the three major objectives which are obtained with this invention are the production of useful energy, the recovery of fresh water, and the purification of the local atmosphere, and any of these objectives can take precedence depending on the particular purposes for which a Tornook is employed.

It is to be understood that the particular configurations and the designated features herein shown and described are for illustrative purposes only and represent only a few of the variations which are inherent in this invention, and changes in size, contour, materials of construction, or in the substitution of functionally equivalent features may be made without departing from the scope of this invention. In particular, the descriptive terms used such as valve, heater, turbine wheels, vanes, collectors, stack, plenum, etc., refer to any functionally equivalent feature or equipment which would meet the particular requirements described. Thus the above description should not be intepreted in any limiting sense. It is intended rather that the invention be limited only by the claims appended hereto.

What is claimed is:

1. A device for the extraction of water from moist air and for the removal of pollutants which may be in said air, wherein said device comprises a tall stack having an enlarged base and a contoured plenum transition portion extending from the base to the stack, with means for initiating and controlling the flow of air through the device, with inlet openings for admitting moist air at the periphery of the base, with means for imparting a tangential velocity component to said moist inlet air and for increasing the rotational velocity by inflow through the transitional plenum to form a vortex with the consequent lowering of the static pressure sufficient to maintain a low average air density in the vortex region of the stack and to produce condensation of water and the removal of said condensed water from the vortex by centrifugal and gravitational forces with a consequent removal of pollutants from the air, with means for reducing the rotational velocity component of the dehumidified air with consequent repressurization and heating of the air which then rises through and exits from the top of the stack, thus providing an average density of air in the stack sufficiently lower than the external air density so as to sustain the flow of air through said device.

2. The device of claim 1 wherein means for the extraction of useful energy from the kinetic energy of the rapidly rotating air mass, are located above the vortex region of the stack.

3. The device of claim 2 wherein means are provided for the recovery of the condensate for useful purposes.

4. The device of claim 2 wherein movable vanes are provided for varying the size and direction of the inlet openings such that the rotational velocity of the inlet air can be adjusted and optimized for varying atmospheric conditions and performance objectives.

5. The device of claim 2 wherein preheaters are located in the base of the device and are used in conjunction with a valve for restricting flow located near the top of the stack, such that a relatively stagnant mass of air in the plenum and stack can be preheated to a high temperature and a consequent low density such that when the heaters are turned off and the valve is opened the outrush of the low density air up the stack will induce the inflow of moist external air through the inlet opening to form the self sustaining vortex action required for the normal operation of the device.

6. The device of claim 2 wherein the contour of the internal surfaces of the base, plenum transition, and stack are designed to achieve a minimum resistance to air flow with the rotating inflow of air converging in a generally bell shaped plenum to form the vortex, and with a generally divergent outlet to minimize exit pressure drop losses at the top of the stack.

7. The device of claim 2 wherein following the passage of the air through the means for the extraction of useful energy the residual rotational velocity is further reduced by a combination of expansion, diffusing, and turning vanes which convert rotational momentum into axial momentum and thus facilitate the flow of the repressurized heated air up the stack, while still maintaining the air density lower than the density of the external air.

8. The device of claim 2 wherein the means for the extraction of useful energy comprise at least one turbine rotor with at least two oppositely extending blades, for the extraction of mechanical energy from the kinetic energy of the rapidly rotating air mass, and with electric generating means driven by said rotor to convert the mechanical energy extracted by the turbine rotor into useful electrical energy.

9. The device of claim 1 wherein means are provided for the recovery of the condensed water for useful purposes.

10. The device of claim 1 wherein movable vanes are provided for varying the size and direction of the inlet openings such that the rotational velocity of the inlet air can be adjusted and optimized for varying atmospheric conditions and performance objectives.

11. The device of claim 1 wherein preheaters are located in the base of the device and are used in conjunction with a valve for restricting flow located near the top of the stack, such that a relatively stagnant mass of air in the plenum and stack can be preheated to a high temperature and a consequent low density such that when the heaters are turned off and the valve is opened the outrush of the low density air up the stack will induce the inflow of moist external air through the inlet openings to form the self sustaining vortex action required for the normal operation of the device.

12. The device of claim 1 wherein the contour of the internal surfaces of the base, plenum transition, and stack are designed to achieve a minimum resistance to air flow with the rotating inflow of air converging in a generally bell shaped plenum to form the vortex, and with a generally divergent outlet to minimize exit pressure drop losses at the top of the stack.

13. The device of claim 1 wherein following the removal of the condensate, the rotational velocity of the vortex is reduced by a combination of expansion, diffusing, and turning vanes which convert rotational momentum into axial momentum and thus facilitate the flow of the repressurized heated air up the stack, while still maintaining the air density lower than the density of the external air.

14. The device of claim 1 wherein means are provided for the recovery of the condensate, with movable vanes provided for varying the size and direction of the inlet openings in order to vary the rotational component of the velocity of the inlet air with preheaters located in the base of the device which are used in conjunction with a valve for restricting flow located near the top of the stack, such that a relatively stagnant mass of air in the plenum and stack can be preheated to a high temperature and a consequent low density such that when the heaters are turned off and the valve is opened, the outrush of the low density air up the stack will induce the inflow of moist external air through the inlet openings to form the self sustaining vortex action, and wherein the contour of the internal surfaces of the base, plenum transition, and stack are designed to achieve minimum resistance to air flow with the rotating inflow of air converging in a generally bell shaped plenum to form the vortex, and with a generally divergent outlet to minimize exit pressure drop losses, and wherein following the removal of the condensate from the vortex, the rotational velocity of the vortex is reduced by a combination of expansion, diffusing and turning vanes which convert rotational momentum into axial momentum and thus facilitate the flow of the repressurized heated air up the stack, while still maintaining the air density lower than the density of the external air.

15. The device of claim 14 wherein means for the extraction of useful energy from the kinetic energy of the rapidly rotating air mass are located above the vortex region of the stack and below the location of the expansion, diffusing and turning vanes which convert some of the residual rotational momentum of the air into axial momentum to facilitate the flow of the repressurized heated air up the stack while still maintaining the air density lower than the density of the external air.

16. The device of claim 15 wherein a small reduction in the rotation of the vortex is induced by another set of expansion, diffusing and turning vanes in the air just prior to entering the means for extracting useful energy, with a consequent small degree of repressurization and heating such that any residual entrained condensate droplets are revaporized, so that the means for extracting useful energy are not subjected to erosion from high velocity water droplets.

* * * * *